United States Patent [19]

Breiholz et al.

[11] Patent Number: 4,594,676
[45] Date of Patent: Jun. 10, 1986

[54] AIRCRAFT GROUNDSPEED MEASUREMENT SYSTEM AND TECHNIQUE

[75] Inventors: Arlen E. Breiholz; Robert H. Pool, both of Marion; Glenn W. Sellers, Cedar Rapids, all of Iowa

[73] Assignee: Rockwell International Corporation, El Segundo, Calif.

[21] Appl. No.: 453,676

[22] Filed: Dec. 27, 1982

[51] Int. Cl.[4] .............................................. G01S 13/58
[52] U.S. Cl. ..................................... 364/565; 343/9 R
[58] Field of Search ................ 343/8, 9 R, 12 A, 14, 343/418, 451; 364/440, 449, 565, 456, 458, 460, 447; 340/979

[56] References Cited

U.S. PATENT DOCUMENTS

| | | | |
|---|---|---|---|
| 3,344,423 | 9/1967 | Thue | 343/12 A |
| 3,860,925 | 1/1975 | Darboren | 343/12 A |
| 4,106,093 | 8/1978 | Grimm et al. | 364/424 |
| 4,146,890 | 3/1979 | Klensch | 343/8 |
| 4,241,347 | 12/1980 | Albanese et al. | 343/14 |
| 4,402,049 | 8/1983 | Gray | 364/456 |
| 4,426,647 | 1/1984 | Tomasi | 343/8 |

OTHER PUBLICATIONS

Miller, Air and Space Navigation System, Dec. '61, Electronics, pp. 55–59.
"Developmental Single-Target Systems", Chapter 8, Sections 1–8 and 10–12 in the book *Frequency Modulated Radar*, by G. C. Luck, McGraw Hill, 1949.
"Some Applications of Frequency Modulated Radar", by Irvin Wolf and G. C. Luck, *RCA Review*, vol. 9, No. 3, 1948.
"Aircraft Velocity Measurement Through Radar Altimeter Echo with Noncoherent Detection", by C. S. Williams, Mar. 1974, pp. 1–49.
"Airborne Dopler Navigation Techniques", Chapter 13 of Radar Techniques for Detection Tracking in Navigation, *Proceedings of the Eighth Symposium of the Agard Avionics Panel*, London, 21–25 Sep. 1964.
"Radio Altimeter", *IRE Transactions on Aeronautical and Navigational Electronics*, Jun. 1954, pp. 3–7.
"The Nature of Doppler Velocity Measurement", *IRE Transactions on Aeronautical and Navigational Electronics*, Sep. 1957, pp. 103–112.
"Principles and Performance Analysis of Doppler Navigation Systems", *IRE Transactions on Aeronautical and Navigational Electronics*, Dec. 1957, pp. 176–196.
"The Design of Airborne Doppler Velocity Measuring Systems", *IRE Transactions on Aeronautical and Navigational Electronics*, Dec. 1957, pp. 157–175.

*Primary Examiner*—Errol A. Krass
*Assistant Examiner*—Thomas G. Black
*Attorney, Agent, or Firm*—George A. Montanye; H. Fredrick Hamann

[57] ABSTRACT

A system and technique is disclosed which enables the measurement and display of aircraft groundspeed using a modified FMCW radar altimeter. The system is constructed to have a conventional FMCW altimeter transmitter and receiver for transmitting and receiving vertical return signals, and a narrowbeam forward-looking antenna and associated receiver for detecting return signals from the forward angle. The transmitted signal is triangularly modulated to produce returns on both the upsweep and downsweep of the modulation and the difference between the frequencies of those returns, as detected by the forward looking antenna, is proportional to aircraft slant velocity. The system also detects slant range and altitude and combines them with slant velocity to produce an output representing the aircraft groundspeed.

22 Claims, 2 Drawing Figures

Microfiche Appendix Included
(1 Microfiche, 67 Pages)

AIRCRAFT GROUNDSPEED MEASUREMENT SYSTEM AND TECHNIQUE

One exemplary form of program used in the performance of one embodiment of the disclosed invention is set forth in microfiche appendix comprising 67 frames on one (1) microfiche.

BACKGROUND OF THE INVENTION

The present invention relates to aircraft instruments, and more particularly, to an FMCW radar system and technique for determining aircraft groundspeed.

One of the more important parameters that is required for aircraft operation and navigation is aircraft groundspeed. During flight, aircraft groundspeed is especially important in determining the flight time between waypoints, in detecting the presence and calculating the speed of head and tail winds, in calculating aircraft position, and in performing other evaluations of aircraft operation. More recently, the measurement of aircraft groundspeed has become inportant in detecting wind sheer so that a pilot may avoid a critical loss of aircraft altitude during flight.

Over the years, a variety of systems and techniques have been developed to provide a measurement of such groundspeed. One exemplary technique involves the use of area navigation equipment including VOR and DME ground stations which provide a signal indicative of aircraft position. Aircraft position can be used to calculate groundspeed by measuring the time change from one position to the next. While this technique provides an approximation of groundspeed, accuracy is limited by the requirement that the aircraft be directly aligned with the particular VOR/DME station. Even when the aircraft is aligned there are still errors which prevent the exact calculation of aircraft groundspeed. Naturally, as the direction of aircraft flight varies from a course which is co-linear with the navigation station, more inaccuracies are introduced into the groundspeed measurement due to the vector relationship of the velocity to flight direction. Accordingly, techniques employing such navigation equipment are at best rough approximations of actual aircraft groundspeed.

In other instances, aircraft groundspeed measurements have been improved by the use of complicated digital systems and techniques which derive groundspeed in a manner related to that described above. Such digital techniques require complicated circuitry for linearizing and filtering high noise signals in order to provide the estimation of aircraft groundspeed. Like the analogous analog systems, the digital techniques rely greatly upon particular flight paths to provide accuracy and are thus only suitable in certain aircraft flight configurations. In addition, the processing needed to produce useful signals requires substantial and sophisticated equipment, adding to the cost and complexity of the system and decreasing its versatility for use in commuter and similar lower cost aircraft.

In one attempt to improve the accuracy of groundspeed measurements, U.S. Pat. No. 4,106,093, assigned to the same assignee as the present invention, utilizes signal inputs from VOR and DME sources and a filter/integrator circuit to produce a groundspeed indicating signal. This technique attempts to provide improved accuracy in the signals representing aircraft position and groundspeed over those previously mentioned attempts using the same VOR/DME stations. Again, the system depends on the presence of VOR/DME signals and, naturally, any inaccessibility to such stations will prevent the acquisition of a groundspeed signal. Accordingly, there is still a need for systems which allow the derivation of groundspeed without reliance upon area navigation stations.

One of the more common techniques employed to determine aircraft groundspeed without the use of VOR/DME and other navigation stations, is that which utilizes a Doppler radar to provide velocity measurement. This technique is widely known and is described in such articles as "The Nature of Doppler Velocity Measurement", *IRE TRANSACTIONS ON AERONAUTICAL AND NAVIGATIONAL ELECTRONICS*, September 1957, pp. 103-112; "Principles and Performance Analysis of Doppler Navigation Systems", *IRE TRANSACTIONS ON AERONAUTICAL AND NAVIGATIONAL ELECTRONICS*, December 1957, pp. 176-196; "The Design of Airborne Doppler Velocity Measuring Systems", *IRE TRANSACTIONS ON AERONAUTICAL AND NAVIGATIONAL ELECTRONICS*, December 1957, pp. 157-175; and "Airborne Doppler Navigation Techniques", Chapter 13 of "Radar Techniques for Detection Tracking in Navigation", *PROCEEDINGS OF THE EIGHTH SYMPOSIUM OF THE AGARD AVIONICS PANEL*, London, Sept. 21-25 1964. As will be appreciated, the disclosed Doppler systems are capable of providing very accurate measurements of groundspeed without reliance on navigation stations. However, the structure forming such systems is complex and costly which decreases its attractiveness for use in lowercost aircraft. In addition, such Doppler systems typically require at least three non-coplanar radar signals to derive groundspeed thereby further increasing the requirements and complexity of the system. While the measurements may be made with only two beams, a third measurement of vertical velocity derived from some other source (e.g., rate of climb meter) is still required to enable the determination of aircraft groundspeed. Thus, known Doppler techniques are incapable of providing a groundspeed measurement without substantial complex and expensive equipment.

In still another attempt to reduce the complexity of aircraft groundspeed measurement systems, a technique was proposed which allows the velocity to be determined with a radar altimeter echo and non-coherent detection. Radar altimeters, their modes and methods of operation, and their applications, have been well-known for some time as evidenced by such articles including "Radio Altimeter" in the *IRE TRANSACTIONS ON AERONAUTICAL AND NAVIGATIONAL ELECTRONICS*, June 1954, pp. 3-7; Chapter 8, Sections 1-8 and 10-12 in the book, *Frequency Modulated Radar*, by G. C. Luck, McGraw Hill, 1949, and "Some Applications of Frequency Modulated Radar" by Irvin Wolf and G. C. Luck, *RCA Review*, Volume 9, No. 3, 1948. In attempting to provide a velocity measurement using radar altimeter systems, the report entitled "Aircraft Velocity Measurement through Radar Altimeter Echo with Non-Coherent Detection" by C. S. Williams, March, 1974, pp. 1-49, utilizes an altimeter echo received from a leading and trailing antenna located along the longitudinal axis of an aircraft. The antennas, each of which transmits vertically downward from the aircraft and receives an echo from the terrain, are separated by a known distance. When the aircraft is in horizontal flight, the received echo signals can provide an approximation of aircraft groundspeed. This technique assumes the velocity vector of the aircraft is parallel to a line joining the two antennas, and parallel to the ground. In any other flight configuration, the approximation decreases in accuracy. Accordingly, even with the proposed use of less expensive radar altimeter techniques to provide an indication of aircraft groundspeed, there is a continuing need to decrease the complexity of such systems even further and to improve their accuracy for use in a variety of aircraft applications.

Accordingly, the present invention has been developed to overcome the specific shortcomings of the above known and similar techniques and to provide an aircraft groundspeed measurement system and technique using radar altimeters.

SUMMARY OF THE INVENTION

In accordance with the present invention, a conventional FMCW radar altimeter is constructed to have a transmit and receive antenna directed vertically down from an aircraft to provide return signals indicative of aircraft altitude. At the same time, the transmitter is coupled to a second receiver which has an antenna configured as a narrow beamwidth forward-looking antenna tilted at a fixed angle from the vertical. The transmitted FMCW signal is modulated by a triangular waveform having an upsweep and a downsweep. In operation, the vertically oriented receiving antenna provides a measurement of aircraft altitude and the forward-looking narrow beam antenna produces an IF beat frequency, a first one on the upsweep and a different one on the downsweep of the modulated signal. The difference between the beat frequency of the return signal detected by the narrow beam antenna during the upsweep and that detected during the downsweep is proportional to the aircraft slant velocity measured along a line whose slope is the effective antenna look angle, while the sum of the beat frequencies detected during the upsweep and downsweep is proportional to the slant range or range to ground at the effective antenna look angle. The signals indicative of slant velocity, slant range, and altitude are combined in a microprocessor and filter circuit to produce a signal which is representative of the horizontal aircraft groundspeed corrected for non-zero vertical velocity. The system utilizes only one FMCW radar transmitter and two receivers oriented and coupled to the transmitter to provide the return FMCW signals for calculating groundspeed.

It is therefore a feature of the invention to provide a simplified system and technique for detecting and providing a relatively inexpensive and less complex calculation and display of aircraft groundspeed.

It is a further feature of the invention to provide a radar altimeter system which is capable of providing an improved indication of aircraft groundspeed.

A further feature of the invention is to provide an FMCW radar altimeter system having a vertically oriented and forward looking antenna for providing measurements of altitude, slant velocity and slant range for enabling the measurement of aircraft groundspeed.

A still further feature of the invention is to provide an FMCW radar altimeter system constructed using conventional apparatus and modified to produce measurements of slant range and slant speed which may be combined with a measurement of altitude and corrected to produce a signal proportional to aircraft groundspeed under non-zero vertical velocity conditions.

Still another feature of the invention is to provide an FMCW radar altimeter system which may incorporate simple and inexpensive microprocessors to provide for the calculation and display of aircraft groundspeed.

Yet another feature of the invention is to provide an FMCW radar altimeter system which is capable of providing aircraft groundspeed measurements independent of the presence of area navigation stations.

These and other advantages and novel features of the invention will become apparent from the following detailed description when considered with the accompanying drawings wherein:

DETAILED DESCRIPTION OF A PREFERRED EMBODIMENT

Figure 1:
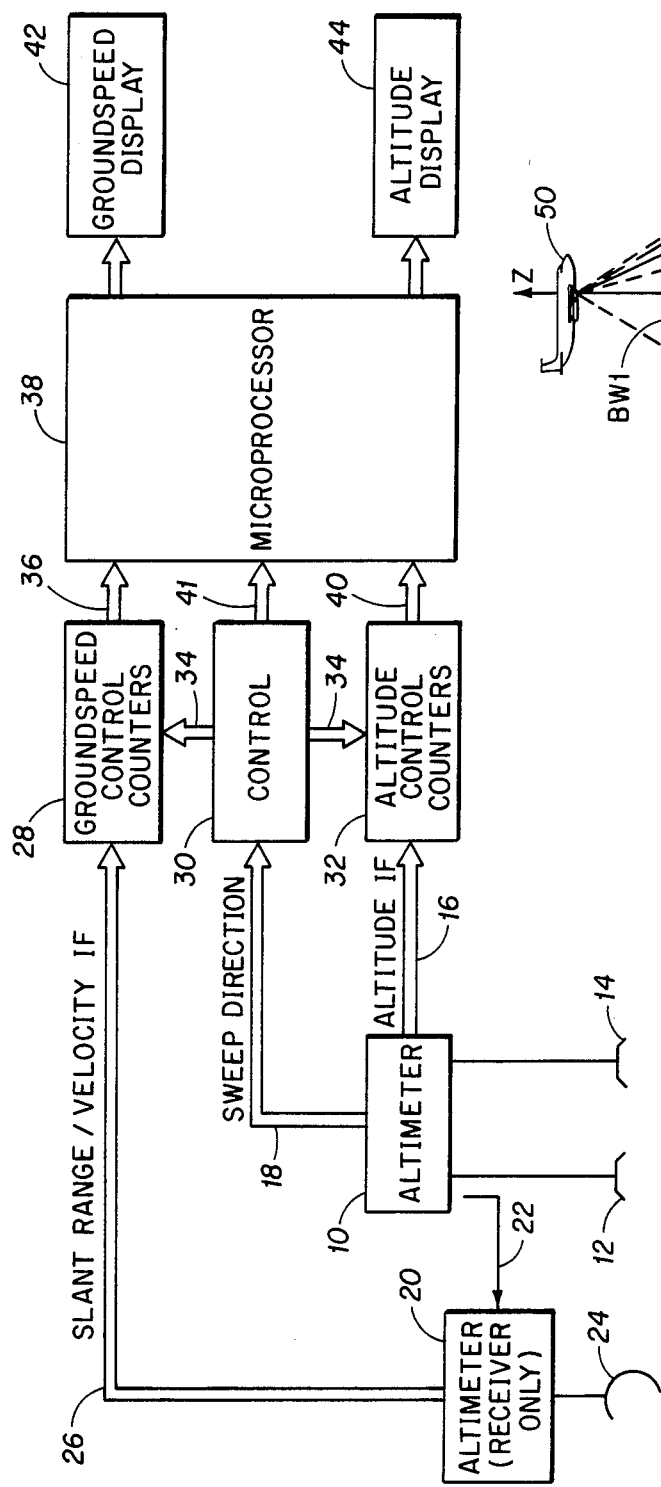
FIG. 1 is a block diagram depicting the construction and arrangement of a radar altimeter and processing system for providing an indication of aircraft groundspeed.

Referring first to FIG. 1, there is shown a block diagram of the proposed system and technique. The system includes a conventional radar altimeter 10 having an antenna 12 for transmitting an FMCW signal from an aircraft and oriented in the aircraft to transmit in a vertical direction relative to the ground. The altimeter 10 is also coupled to an FMCW receiving antenna 14 which detects the reflected return signal for measurement of altitude. In a typical FMCW system, the transmitted frequency may be modulated by a triangular waveform having an upsweep and downsweep and this modulated output is coupled by, for example, a directional coupler for mixing with the received return signal to produce an intermediate (IF) beat frequency indicative of aircraft altitude. In the present instance, altimeter 10 also provides an output 18 representing the sweep direction of the triangular modultion. The construction and operation of such a conventional system is well known and may be easily understood by reference to the aforementioned articles which are hereby incorporated by reference in their entirety.

The output from the altimeter 10 after mixing is an IF signal which is normally filtered and provided to a display 44 which reads the IF beat frequency as a direct measure of altitude. In FIG. 1, this IF output is provided over line 16 to altitude counters 32 which detect the beat frequency, and thence through microprocessor 38 which scales and couples the signal to a display 44 for visually displaying the altitude. In accordance with the present invention, the antennas 12 and 14 are selected to have a wide beamwidth similar to that used in standard FMCW radar altimeters wherein such antennas may, for example, have 3 dB beamwidths BW1 (FIG. 2) of about 50°.

In order to implement the present invention, a second FMCW radar altimeter 20 is employed in the aircraft. The altimeter 20 may be coupled to receive a return signal through antenna 24 which is mixed with a portion of the transmitted signal from altimeter 10 by means of a second directional coupler 22. The mixed signals from coupler 22 and antenna 24 produce an IF beat frequency in the same manner as that produced in altimeter 10. In this instance, however, the portion of the transmitted signal mixed with the return signal in altimeter 20 is derived from the transmitter of altimeter 10 rather than its own transmitter. Also, the receiving antenna of altimeter 20 is a narrow beamwidth antenna 24 which may, for example, be a parabolic reflector having a 3 dB beamwidth BW2 (FIG. 2) of approximately 9°. The antenna 24 is positioned in the aircraft so that it faces down and forward generally in the direction of aircraft movement. The forward looking angle Θ (FIG. 2) of antenna 24 may be any of a variety capable of receiving the needed signals as hereinafter described, but may, for example, be 20° forward from the vertical. The antenna 24 thereafter receives reflected return signals from transmitting antenna 12 along narrow angles from the vertical and within beamwidth BW2. These return signals are mixed with the signals from coupler 22 to provide the IF beat frequency as output over line 26. As is known, the IF beat frequency produced by altimeter 20 during the upsweep of the triangular modulation will be different than that produced during the downsweep due to the Doppler effect.

In order to provide for the measurement and display of groundspeed using the system of the present invention, the output signals on line 26, line 18, and line 16 are coupled, respectively, to control circuits 28, 30, and 32. Control 28 generally includes circuitry constructed to provide separate outputs of the IF beat frequency provided on line 26, one for the upsweep of the modulation and one for the downsweep. Control 28 may, for example, be parallel connected up/down counters which are energized to count in response to a signal on line 34.

Control 30 is coupled to receive a signal from line 18 representing the direction of modulation sweep (i.e., up or down) and accordingly may provide an output signal distinguishing between the IF beat frequency produced on the modulation upsweep from that produced on the downsweep. The control 30 may, for example, be a simple slope detector which provides a binary high or low signal depending on the direction of the altimeter 10 modulation source. This signal may be coupled over line 34 to the parallel connected up/down counters so that one of the counters of control 28 counts the zero crossings of the IF beat frequency on line 26 on the upsweep of the modulation source and the other of the counters counts the zero crossings of the IF beat frequency on the downsweep of the modulation source. These counts may then be provided as an output 36 and coupled to a microprocessor 38.

The same control 30 may also be coupled to control circuitry 32 which detects the IF beat frequency at output 16 on the upsweep and downsweep of the modulation. This control circuitry 32 may also be parallel counters which provide a count indicative of the beat frequency on the upsweep and downsweep, the output 40 of which represents the altitude of the aircraft. The output 40 may be coupled to the microprocessor 38 for providing an indication of altitude on display 44 in the conventional manner and for enabling the calculation of groundspeed as will be subsequently described. An output 41 of the control 30 may additionally be coupled to the microprocessor 38 to again provide a high or low level binary signal representing the direction of sweep frequency so that the operation of the microprocessor 38 may be coordinated and timed with respect to the upsweep and downsweep of the frequency modulation source in the altimeter 10. Naturally, the microprocessor 38 may also be coupled to control the reset of control circuits 28 and 32.

Figure 2:
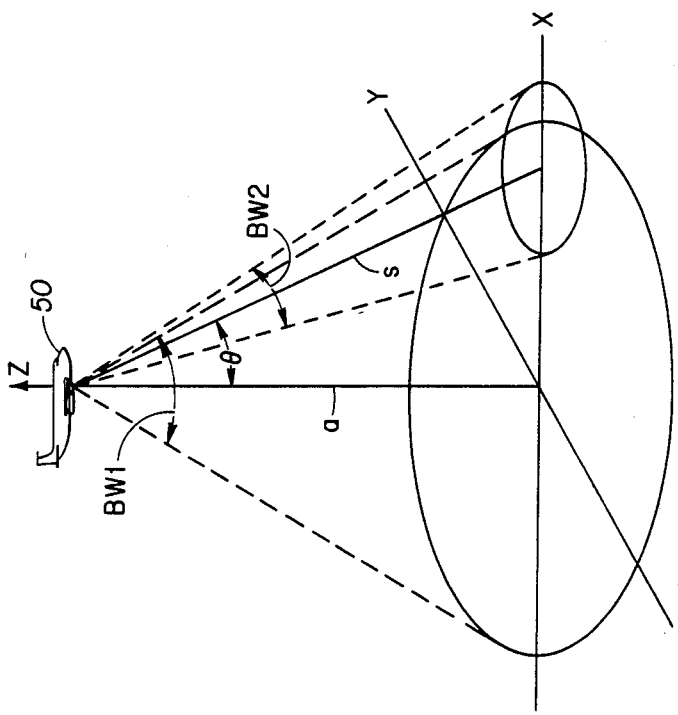
FIG. 2 is a schematic diagram showing the mathematical relationship defined by aircraft flight and antenna placement in accordance with the present system.

Referring now to FIG. 2, the operation of the system depicted in FIG. 1 will now be described. In the embodiment shown in FIG. 1, the FMCW radar altimeter 10 may be normally operated to transmit signals to the ground and thereby provide reflected return signals to the two antennas 14 and 24. Accordingly, the transmit antenna 12 is directed in a vertical direction from the aircraft to ground and produces wide beamwidth signals which are reflected to produce return signals detected by the antennas 14 and 24. The antenna 14 operates as a conventional FMCW radar receiving antenna to receive signals within beamwidth BW1 which are mixed as described to produce the IF beat frequency which is detected in altitude counters 32 and is indicative of aircraft altitude. At the same time, reflected return signals within the beamwidth BW2 forward of the aircraft will be received along the narrow beam path of antenna 24.

When the return signals received by antenna 24 are mixed with the signal transmitted by the antenna 12 through directional coupler 22, the altimeter 20 produces an IF beat frequency output on line 26. During the upsweep of the triangular modulation from altimeter 10, the beat frequency will be different from that obtained during the downsweep of the same triangular modulation as a result of conventional Doppler effects. As is understood, the difference between the beat frequency on the upsweep and the beat frequency on the downsweep is proportional to aircraft slant velocity measured along a line s whose slope is the effective antenna look angle of the forward-looking antenna 24. Likewise, the sum of the beat frequency on the upsweep and the beat frequency on the downsweep is proportional to the range to the ground along line s at the effective look angle of antenna 24. When the signal outputs from 36 are processed by the microprocessor 38 to produce signals representing slant range and slant velocity, and then combined with the signal from 40 representing altitude, a value proportional to groundspeed may be calculated in microprocessor 38 that may be corrected by the signal from 40 representing altitude to compensate for non-zero vertical velocity.

Referring again to FIG. 2, the diagram shows a representation of the orientation of the aircraft and associated antennas needed to provide a measurement and display of groundspeed. In accordance with the described technique, it will be understood that the development, measurement and display of groundspeed relies on the Doppler effect frequency shift expressed by the equation $$\Delta f = \frac{2vf_c}{c} \tag{1}$$

for a reflected return signal; where $f_c$ is the transmitted signal frequency, $\Delta f$ is the difference between the received frequency (reflected return) and $f_c$, v is the velocity of the transmitter/receiver (aircraft) relative to the reflector (ground), and c is the speed of light.

Assume now that the system of FIG. 1 provides a single transmitting antenna 12 which illuminates the field of view BW1 and produces return signals in the field of view BW1 and BW2 of the two receiving antennas 14 and 24, respectively. Also assume that antenna 14 is directed vertically downward from an aircraft 50 along the line a and antenna 24 is directed forward along the line s at an angle Θ from the vertical. In this instance, the downward looking antenna 14 measures a distance represented by the line a and the forward looking antenna 24 measures a distance represented by the line s. Additionally, while the aircraft is moving, the signal received by the forward looking antenna 24 is shifted in frequency by some amount $f_d$ due to the Doppler effect.

If, for purposes of illustration, it is assumed that the velocity of the aircraft is entirely in the forward direction, the velocity measured along s will be the sum of a vertical and horizontal component iven by the equation:

$$v_s = v_v \cos\theta + v_h \sin\theta \qquad (2)$$

where $v_v$ is the vertical component of velocity and $v_h$ is the horizontal component of velocity and represents groundspeed. Referring again to equation 1, the shift in frequency can be expressed as:

$$\Delta f = f_d = \frac{2v_s f_c}{c} = \frac{2(v_v \cos\theta + v_h \sin\theta)f_c}{c} \qquad (3)$$

If we now solve for the horizontal velocity $v_h$, then:

$$v_h = \frac{1}{2f_c(\sin\theta)}(cf_d - 2v_v f_c \cos\theta) \qquad (4)$$

$$= \frac{cf_d}{2f_c \sin\theta} - v_v \operatorname{ctn}\theta$$

In an FMCW radar altimeter with a triangular modulation sweep, as that disclosed above, the shift in frequency of the reflected return signal is exhibited as the difference between the IF beat frequency detected during the downsweep of the modulation and the IF beat frequency detected during the upsweep of the modulation. Actually, the return on the downsweep is shifted up by $f_d$ from the zero Doppler frequency with the resultant beat frequency defined as $f_h$, and the return on the upsweep is shifted down by $f_d$ from the zero Doppler frequency resulting in the frequency defined as $f_l$. The net difference may thus be represented by the equation:

$$f_h - f_l = 2f_d \qquad (5)$$

As is known, the slant range s is proportional to a frequency $f_s$ which is the mean of the two frequencies $f_h$ and $f_l$ and may be represented by the equation:

$$f_s = \frac{f_h + f_l}{2} \qquad (6)$$

Recognizing that the frequency $f_s$ can be used in the same way as the normal altimeter IF frequency, it will be apparent that $$\sin\theta_v = \frac{\sqrt{s^2 - a^2}}{s} = \frac{\sqrt{f_s^2 - f_a^2}}{f_s} \qquad (7)$$

and $$\operatorname{ctn}\theta_v = \frac{a}{\sqrt{s^2 - a^2}} = \frac{f_a}{\sqrt{f_s^2 - f_a^2}} \qquad (8)$$

where a is the vertical range or altitude of the aircraft and $f_a$ is the IF beat frequency produced by the down-looking antenna 14 in altimeter 10.

Referring again to equations (5), (7), and (8), and substituting them into the groundspeed or horizontal velocity equation (4) gives:

$$v_h = \frac{c(f_h - f_l)f_s}{4f_c\sqrt{f_s^2 - f_a^2}} - v_v \frac{f_a}{\sqrt{f_s^2 - f_a^2}} \qquad (9)$$

$$= \frac{\left(\frac{c}{4f_c}\right)(f_h - f_l)f_s - \left(\frac{4f_c}{c}\right)v_v f_a}{\sqrt{f_s^2 - f_a^2}}$$

As will be apparent, the quantity $v_v$ still must be determined in order to solve for the horizontal velocity or groundspeed $v_h$. If it is remembered that it is desired to provide a computation of groundspeed in discrete time, then there will exist a current altitude $a_n$ which has a corresponding beat frequency $f_{an}$ and a next-previous altitude $a_{n-1}$ which has a corresponding beat frequency $f_{an-1}$. Using these variables, a vertical velocity estimate can be made which is given by:

$$v_v \approx \frac{1}{T_s}(a_n - a_{n-1}) \qquad (10)$$

$$\approx \frac{1}{BT_s}(f_{an} - f_{an-1})$$

where $T_s$ is the sample period for detecting the discrete values $a_n$ and $a_{n-1}$ and B is the frequency-to-altitude conversion constant which is characteristic of the particular altimeter employed. Now using the above, the equation for $v_h$ can be written as:

$$v_h = \frac{\left(\frac{c}{4f_c}\right)(f_h - f_l)f_s - \left(\frac{4f_c}{BT_s c}\right)(f_{an} - f_{an-1})f_{an}}{\sqrt{f_s^2 - f_{an}^2}} \qquad (11)$$

In implementing the system of FIG. 1, one of the simplest methods is to take samples at intervals $T_s$ which may be easily accomplished by counting the zero crossings of the return IF beat frequency signals over the period $T_s$. However, it is necessary that the zero crossing counts be made separately on both tne upsweeps and downsweeps. Thus, the effective period for each of the counts becomes $T_s/2$. Accordingly, since there are two zero crossings (Z) per cycle in period (T) of the function in general, the frequency (f) is $$f = \frac{Z}{2T} \qquad (12)$$

This leads to the expressions:

$$f_a = \frac{A}{2T_s} \qquad (13)$$

$$f_h = \frac{d}{2(T_s/2)} = \frac{d}{T_s} \qquad (14)$$

$$f_l = \frac{u}{2(T_s/2)} = \frac{u}{T_s} \qquad (15)$$

where A is the zero-crossing count representing the beat frequency produced by the vertical return signals over the period $T_s$, and d and u are the zero-crossing counts representing the beat frequency produced by the slant return signals on the separate upsweeps and downsweeps over $T_s$ (but effectively over $T_s/2$). Using the above and equations (5) and (6) results in the following:

$$f_h - f_1 = \frac{d-u}{T_s} = \frac{D}{T_s} \qquad (16)$$

and $$f_s = \frac{f_h + f_1}{2} = \frac{d+u}{2T_s} = \frac{S}{2T_s} \qquad (17)$$

where $D = d - u$ and $S = d + u$.

Now, if equations (13) through (17) are substituted into equation (11) for groundspeed, the equation becomes:

$$v_h = \qquad (18)$$

$$\frac{\left(\frac{c}{4f_c}\right)\left(\frac{D}{T_s}\right)\frac{S}{2T_s} - \left(\frac{4f_c}{BT_sc}\right)\left(\frac{A_n}{2T_s} - \frac{A_{n-1}}{2T_s}\right)\frac{A_n}{2T_s}}{\sqrt{\left(\frac{S}{2T_s}\right)^2 - \left(\frac{A_n}{2T_s}\right)^2}}$$

$$= \left(\frac{c}{4f_cT_s}\right)\frac{\left[DS - \left(\frac{16f_c^2}{c^2B}\right)(A_n - A_{n-1})A_n\right]}{\sqrt{S^2 - A_n^2}}$$

Equation 18 thus represents a value approxiamtely groundspeed except for the fact that a conventional FMCW radar alimeter does not normally have a zero IF beat frequency when the display indicates zero feet. The IF frequency is purposely offset to allow for installation differences and landing gear extension, and the effect of this bias or offset may be cancelled by subtracting correction terms from the A and S terms in equation 18. The correction terms may be disignated as $C_A$ and $C_S$, respectively, and are dependent upon the lengths of the RF transmission lines, the internal delays of the equipment, and other factors determined by the specific unit which may be easily measured following altimeter installation. Substituting $C_A$ and $C_S$ into equation 18 results in:

$$v_h = \left(\frac{c}{4f_cT_s}\right)\frac{\left[D(S - C_S) - \frac{16f_c^2}{c^2B}(A_n - A_{n-1})(A_n - C_A)\right]}{\sqrt{(S - C_S)^2 - (A_n - C_A)^2}} \qquad (19)$$

If the constants are now consolidated and defined as:

$$K_1 = \frac{c}{4f_c T_s} \qquad (20)$$

and $$K_2 = \frac{16f_c^2}{c^2B} \qquad (21)$$

and the terms of equation (19) rearranged, $v_h$ may then be rewritten as follows:

$$v_h = K_1 \frac{\left[D - K_2(A_n - A_{n-1})\frac{(A_n - C_A)}{(S - C_S)}\right](S - C_S)}{\sqrt{(S - C_S)^2 - (A_n - C_A)^2}} \qquad (22)$$

where $A_n$ is the most recent altitude count, $A_{n-1}$ is the next prior altitude count, $C_A$ is the altitude correction constant as described above, $C_S$ is the sum correction term as above described, D is the difference between the downsweep counts d and the upsweep counts u representing beat frequency, $K_1$ is the scaling factor as described above, $K_2$ is the altitude rate scaling factor as described above, and S is the sum of the downsweep counts d and the upsweep counts u representing beat frequency over the sampling period. In the present example, $f_c$ is equal to 4.3 gigahertz, $T_s$ is equal to 0.1 second, c is equal to the speed of light, B is equal to 40 Hz/ft, $K_1$ is equal to 0.3388 and $K_2$ is equal to 2.1859. As was previously stated, the constant $C_S$ and $C_A$ are dependent upon system construction and are generally within the range of 200 to 400 counts.

In a test of the operation of the system shown in FIG. 1, two standard 860 F-1 FMCW radar altimeters manufactured by Rockwell International Corporation, were used to produce a measurement of groundspeed. One was essentially operated as a normal radar altimeter 10 as was described with respect to FIG. 1, while the second altimeter 20 was operated as a receiver only with its transmitter disabled and a portion of the transmitted signal from the first unit 10 provided through coupler 22 to the IF mixer of the second altimeter 20. The forward looking antenna of the second altimeter 20 was replaced with a parabolic reflector antenna having a 3 dB beamwidth of 9° positioned in a forward looking direction at an angle of 20° from the vertical. The modulator in the altimeter 10 provided a 100 Hz squarewave which was used as a timing reference signal in the operation of the system. In the present instance, the microprocessor 38 was a MC6800 microprocessor manufactured by Motorola, Inc., but could just as well be any general purpose microprocessor programmed as will be detailed hereinafter.

In addition to the conventional FMCW altimeters, a set of frequency counters with associated control logic was used for the control circuitry 28, 30 and 32. Timing of the counters was controlled by coupling the 100 Hz square wave from the altimeter 10 to drive the counters. The timing was controlled so that the counters were allowed to count for 10 cycles (0.1 second) of the 100 Hz squarewave signal. The counters were constructed so that at the end of each period of 10 cycles, the counts were transferred to latches, the counters were reset and an interrupt signal was sent to the microprocessor 38. One count of all zero crossings of the IF beat frequency from altimeter 20 at output 26 represents the beat frequency during the modulation upsweep and another count of all the zero crossings of the IF beat frequency from 26 represents the beat frequency during the modulation downsweep. A third count detected by the counters of control circuitry 32, was a count of the zero crossings of the IF beat frequency of output 16 over the entire modulation cycle. This total count was proportional to the average frequency of the signals over the sampled time period and thus represented the altitude of the aircraft.

All counts were provided to the microprocessor 38 through outputs 36 and 40. Coupling between the counters and control circuitry 28, 30 and 32 was provided through a standard peripheral interface circuit which received the interrupts and selected and read counter outputs in response to software control. The software used to provide the measurement and display of groundspeed in accordance with the previously-developed equations are set forth in the appendix and are described in greater detail below.

Turning now to the program set forth in the microfiche appendix filed in connection with this specification, the same is directed to control the processing steps of the microprocessor 38 and control circuitry 28, 30 and 32 to provide a solution to the groundspeed equation generally set forth at 22. As will be appreciated, in equation (22), the $(A_n - A_{n-1})$ term can be represented as $\Delta A$ and the $A_n$ term represented as A so that the equation is simplified as follows:

$$v_h = \frac{K_1 \left[ D - K_2 (\Delta A) \frac{(A - C_A)}{(S - C_S)} \right] (S - C_S)}{\sqrt{(S - C_S)^2 - (A - C_A)^2}} \quad (23)$$

In this form, the term $$\frac{K_2 (\Delta A) (A - C_A)}{(S - C_S)} \quad (24)$$

is a correction factor for altitude rate which is formed in the software by calculating the difference of the current altitude count (An) minus the previous one (An−1), to produce $\Delta A$, and multiplying it by the cosine of the angle of the slant measurement from vertical (which is the altitude A divided by slant range with correction factors) and multiplied by the correction constant $K_2$ to reconcile the units. This correction factor is then subtracted from the slant velocity in equation 22 or 23 to produce the final mathematical expression representing groundspeed derived by using the measurements obtained from the system of FIG. 1. While the program employed in this example is set forth in the aforementioned appendix and specifically written in assembler language for the 6800 microprocessor, a broad overview of its operation can be understood from the following description. Within the program, there is an interrupt routine which performs computations in response to the interrupt signal received after each 0.1 second sampling interval (previously described). The interrupt routine inputs three 16-bit zero crossing counts obtained from the up and down counters of the control circuit 28 and the altitude counters of control circuit 32. The altimeter bias is immediately subtracted from the altitude count $(A - C_A)$ and the difference (D) between the zero crossing counts on the upsweep and downsweep is formed. At the same time, the sum (S) of the zero crossing counts for the upsweep and downsweep is calculated and the altimeter bias subtracted from that value $(S - C_S)$. If either bias subtraction results in a negative value, the program initiates an identifying code to transfer control of the program to an error-handling routine.

The program subsequently computes an angle correction factor by computing the square of the corrected altitude $(A - C_A)^2$ and the square of the corrected sum $(S - C_S)^2$, with the corrected square of the altitude then being subtracted from the corrected square of the sum. A negative or zero value at this time again results in the generation of an identifying code which controls a transfer to the error-handling routine.

At this time, the altitude rate (vertical velocity) correction factor is also computed wherein the cosine of the angle of the beam from the vertical is computed by dividing the corrected altitude by the corrected sum $[(A - C_A)/(S - C_S)]$, and this factor is multiplied by the constant factor $K_2$. The next-previous altitude count is then subtracted from the current altitude count $(A_n - A_{n-1})$ to give $\Delta A$ which is multiplied by the altitude rate correction factor just previously computed. The result of this multiplication is then subtracted from the difference count D representing slant speed and again, if a negative result is obtained, an identifying code is generated transferring control of the program to the error-handling routine.

Next, the square root of the previously-computed difference of the squares of the corrected sum and the corrected altitude $[(S - C_S)^2 - (A - C_A)^2]$ is computed, and the corrected sum $(S - C_S)$ is divided by this value. The resultant value of this division is the cosecant of the look angle relative to the vertical. This is multiplied by the difference D (after subtraction of the term defined by equation 24), which results in a difference value D corrected for both the altitude rate and the effective look angle which varies with terrain. In this regard, it should be noted that although the nominal angle of the returns detected by antenna 24 is its 20° forward angle from the vertical, the effective look angle is determined by various conditions including aircraft orientation and variations in the terrain. The correction for the look angle must therefore be made, in accordance with that described above, to produce the proper groundspeed result. Since all the terms have now been calculated, the only remaining step is to multiply the value obtained to this point by the constant $K_1$ to produce a groundspeed signal. It has been determined, however, that due to the noise contained in the groundspeed signal, the program must provide for limiting and filtering before a useful value for groundspeed can be obtained.

Accordingly, the program is constructed to provide an input excursion limiter or rate limiter in the form of a subroutine. This subroutine limits the maximum amount by which the input to a digital filter, as will be subsequently described, may differ from its (digital filter) output up to some limit value which can itself change adaptively between three empirical values. The limiter is formulated to change adaptively so as to minimize fluctuation of the signal under constant speed conditions, while allowing tracking of the groundspeed for fairly rapid changes in speed. The limiter subroutine maintains a counter (initially zero) and three possible limits (R1, R2 and R3) as well as a preset limit (initially R1) and a direction flag. The direction flag has values corresponding to up, down, and no limit, and is used to indicate in which direction limiting has occurred at the previous interrupt. In operation, the counter is restrained to remain within some closed interval extending from zero to some empirical maximum count. The limiter then operates by subtracting the new limiter input from the present digital filter output. If the magnitude of the difference (between the new limiter input and present digital filter output) is less than the current limit (R1, R2 or R3), no limiting takes place and the counter is decremented and the direction flag cleared. If a new limiter count is less than a specified first empirical trigger value the limit is set to R1 for the next pass. Alternatively, if the new limiter count is larger than the first empirical trigger value but smaller than a second empirical trigger value, the limit becomes R2. Otherwise the limit is unchanged.

If the magnitude of the difference obtained by subtracting the new limiter input from the present digital filter output exceeds the current limit, the new limiter input value is set equal to the last limiter output plus-or-minus the current limit as appropriate. The direction flag is then checked, and if the last direction is different from the current one, the flag is changed and the counter is decremented as described above, including the changes in limit. If the current and last directions are the same, the counter is incremented (unless it has reached its maximum). Accordingly, as the count in the counter increases, two trigger values of the count cause the R2 and R3 limit values to become the active limits in the same way as previously described for the R1 and R2 limit values. Also, as the limiter input values continue to greatly and consistently differ from the filter output value, the rate limit becomes larger and larger a second time until the digital filter output moves to the limiter input value at which time the limit closes down to minimize the effect of noise spikes on the digital filter.

The implementation of the digital filter in the program is a straight forward construction of a two-pole or recursive digital design given by the equation:

$$Y_n = C[X_n + (K_4 \cdot Y_{n-1}) - (K_5 \cdot Y_{n-2})] \tag{25}$$

where C, $K_4$ and $K_5$ are constants, $X_n$ is the current input, $Y_n$ the current output, and $Y_{n-2}$ and $Y_{n-1}$ are the outputs from the two previous sample periods. In the program, the two delayed output terms $Y_{n-1}$ and $Y_{n-2}$ are first multiplied by their respective constants $K_4$ and $K_5$. The constants are each 24 bits, 8 of which are fractional, and the output terms are 32 bits, 16 of which are fractional. This result is truncated to a 32 bit integer. The two products ($K_4$ times $Y_{n-1}$ and $K_5$ times $Y_{n-2}$) are then subtracted as shown and the new input ($X_n$) is added to that value. The additions are all in 32-bit integers and the result of the additions is multiplied by a 24-bit fractional scaling constant C, resulting in a 32 bit value 16 bits of which are fractional. The entire 32 bits are useo as delayed output terms, but only the 16 integer bits are considered output and used by the excursion limiter.

After the scaling multiplication by C, the digital outputs are shifted down to the next greater delay position so that the digital output $Y_n$ becomes the first delayed digital output $Y_{n-1}$ and $Y_{n-1}$ becomes the next delayed digital output $Y_{n-2}$. At the same time, the altitude is copied into the delayed altitude position and any error identifying code previously generated is cleared at the completion of the actual computation.

In the error-handling portion of the program, the identifying code generated upon the occurrence of an error event (previously described) is stored for use in conjunction with the interrupt routine. An error counter is used and is incremented in response to each identifying code. If the value in the error count exceeds a certain value corresponding to a predetermined percentage of all interrupts in a counting period, the code is transferred to a storage position where it is used to blank or flag the display 42 indicating an error condition. In the main program, the flag which signals a cessation of the interrupts is cleared and the operation of the program subsequent to that clearance will be described hereinafter. However, an interrupt counter is incremented and this counter counts to a fixed value at which time it resets both itself and the error counter. In operation, if the interrupt counter is allowed to count to twenty (for two seconds) and control is passed to the error routine at least eight times for the reasons previously described, an error code will be transferred to the main program to indicate that at least 40 percent of the interrupts in the two second period have produced errors.

After preparing the input of the first count values (from 28 and 32) at the next interrupt, control is returned to the main portion of the program by specific instructions. The main program has three separate entry points, the first of which is entered only after a machine reset. In addition to the functions of the other two entry points, the program initializes the peripheral interface adapter to receive the input counts and accept interrupts. The second entry point clears the error and rate limit counter of the interrupt routine and transmits a data label to the display. The third entry point clears an interrupt inhibit flag and continues with the display process.

The output of the digital filter is transferred to a 32 bit memory where it is converted to floating point. A conversion routine in the program assumes an integer input. After conversion, the representative number is then multiplied by a floating point scaling constant ($K_1$) to produce the corrected groundspeed. The identifying code set by the interrupt routine is then tested to determine if it is non-zero, in which case the display is blanked or some other flag signal provided. If the identifying code is zero, indicating no error, and the groundspeed is within the appropriate range, the integer part of the speed is converted to three binary coded decimal digits and provided as output for a display 42. At that time, the program implements a loop which controls the display update so that the display output is made at a rate which prevents blinking when using the data from the microprocessor 38.

In a test of the above system, measurement and display of groundspeed was obtained for flights generally over ground surfaces. Over water or other smooth surfaces, accurate readings for groundspeed do not appear possible, apparently due to the lack of backscatter from those smooth surfaces at other than near-normal incidence. This deficiency may be overcome artificially by placing reflectors over specific portions of smooth areas to enable the generation of such backscatter. However, the above technique still appears to provide a significantly simplified method of calculating groundspeed over most land flight areas for aircraft flight paths.

As can be seen from the above description, the invention may be implemented with simple modifications to conventional structure, thereby reducing the cost and complexity of the groundspeed detection system. This allows substantial versatility in the applications to which the system can be made and reduces the cost for obtaining groundspeed measurement. Using a simple and inexpensive microprocessor, the required computations can be performed with appropriate filtering and limiting as is required to extract the groundspeed signal. Use of the microprocessor allows alternative filtering and digital compensation techniques to further improve signal accuracy. All of these are features that are not taught or shown in the prior art.

Obviously, many modifications and variations of the present invention are possible in light of the above teachings. It is therefore to be understood that within the scope of the appended claims, the invention may be practiced otherwise than as specifically described.

What is claimed is:

1. An aircraft groundspeed measurement system comprising:
   means for transmitting a radar signal from an aircraft towards a target area;
   first means for receiving reflected radar return signals from a target area vertically beneath an aircraft and providing an output representing aircraft altitude;
   second means for receiving reflected radar return signals from a target area at a slant angle forward of the aircraft and providing an output representing aircraft slant velocity along said slant angle and aircraft slant range to said target area along said slant angle; and
   means responsive to said output representing altitude, slant range, and slant velocity, for calculating and providing an output signal representing aircraft groundspeed for a mathematical relationship correlating said altitude, slant range and slant velocity.

2. An aircraft groundspeed measurement system comprising:
   means for providing a modulating signal;
   means responisve to said modulating signal for generating a variable frequency signal;
   means for transmitting said variable frequency signal from an aircraft to a target area beneath the aircraft;
   first means for receiving reflected returns of said variable frequency signal from a first target area vertically beneath an aircraft;
   second means for receiving reflected returns of said variable frequency signal from a second target area at a slant angle forward of an aircraft;
   third means coupled to said first means for mixing a portion of said variable frequency signal with said received reflected returns from said first target area to produce a beat frequency and providing an output representing aircraft altitude;
   fourth means coupled to said second means for mixing a portion of said variable frequency signal with said received reflected returns from said second target area to produce a beat frequency and providing outputs representing aircraft slant range to the target area forward of said aircraft along the slant angle and aircraft slant velocity along the same slant angle; and 3. An aircraft groundspeed measurement system comprising:
   means for transmitted a radar signal from an aircraft towards a target area wherein said means for transmitting includes a transmitting antenna having a first predetermined beamwidth;
   first means for receiving reflected radar return signals from a target area vertically beneath an aircraft and providing an output representing aircraft altitude wherein said first means includes an antenna having a beamwidth equal to said first predetermined beamwidth;
   second means for receiving reflected radar return signal from a target area at a slant angle forward of the aircraft and providing an output representing aircraft slant velocity along said slant angle and aircraft slant range to said target area along said slant angle wherein said second means includes an antenna having a beamwidth substantially less than said first predeterimed beamwidth; and
   means responisve to said output representing altitude, slant range, and slant velocity, for calculating and providing an output signal representing aircraft groundspeed.

4. The system of claim 3 wherein said means for transmitting a radar signal comprises:
   means for providing a triangular modulating signal having an upsweep and a downsweep;
   means responsive to said triangular modulating signal for generating a variable frequency output signal; and
   means for transmitting said variable frequency output signal to said target area.

5. The system of claim 4 wherein said second means for receiving reflected return signals comprises means for detecting reflected return signals on the downsweep of said triangular modulating signal, and means for detecting reflected return signals on the upsweep of said triangular modulating signal.

6. The system of claim 4 wherein said second means for receiving the reflected return signals comprises:
   an antenna for receiving return signals reflected from said target area forward of an aircraft;
   means coupled to said antenna for mixing a portion of said received reflected return signals with said transmitted variable frequency output signal to produce a beat frequency;
   means for detecting the beat frequency produced during the downsweep of said triangular modulating signal; and
   means for detecting the beat frequency produced during the upsweep of said triangular modulating signal.

7. The system of claim 6 wherein said means for calculating includes means for subtracting the beat frequency produced on the upsweep of the triangular modulating signal from the beat frequency produced on the downsweep of the triangular modulating signal, and means for summing the beat frequency produced on the downsweep of the triangular modulating signal with the beat frequency produced on the upsweep of the triangular modulating signal.

8. The apparatus of claim 3 wherein said means for calculating further comprises means for correcting said groundspeed output signal to compensate for variations caused by changes in the vertical velocity of an aircraft and the slant angle of reflected returns received from said target area forward of an aircraft.

9. The system of claim 3 further including means responsive to said output signal representing groundspeed for displaying a visual indication of groundspeed.

10. The system of claim 3 wherein said means for transmitting a radar signal comprises means for generating a variable frequency signal and means for transmitting said varaible frequency signal to said target area.

11. The system of claim 3 wherein siad means for transmitting a radar signal and said first means for receiving a reflected radar return signal comprises an FMCW radar altimeter.

12. An aircraft groundspeed measurement system comprising:
   means for providing a modulating signal;
   means responsive to said modulating signal for generating a variable frequency signal;

means for transmitting said variable frequency signal from an aircraft to a target area beneath the aircraft wherein said means for transmitting includes an antenna having a first predetermined beamwidth;

first means for receiving reflected returns of said variable frequency signal from a first target area vertically beneath an aircraft wherein said first means includes an antenna having a beamwidth equal to said first predetermined beamwidth;

second means for receiving reflected returns of said variable frequency signal from a second target area at a slant angle forward of an aircraft wherein said second means inlcudes an antenna having a beamwidth substantially less than said first predetermined beamwidth;

third means coupled to said first means for mixing a portion of said variable frequency signal with said received reflected returns from said first target area to produce a beat frequency and providing an output representing aircraft altitude;

fourth means coupled to said second means for mixing a portion of said variable frequency signal with said received reflected returns from said second target area to produce a beat frequency and providing outputs representing aircraft slant range to the target area forward of said aircraft along the slant angle and aircraft slant velocity along the same slant angle; and means responsive to said outputs representing aircraft altitude, aircraft slant velocity, and aircraft slant range for calculating and providing an output signal representing aircraft groundspeed.

13. The system of claim 12 wherein said means for calculating comprises a microprocessor.

14. The system of claim 12 further comprising display means coupled to said microprocessor and responsive to the output signal representing groundspeed for providing a visual indication of groundspeed.

15. The system of claim 12 wherein said means for providing a modulating signal comprises means for providing a triangular modulating signal having an upsweep and a downsweep.

16. The system of claim 15 wherein said means coupled to said second means further includes means for detecting the beat frequency produced during the downsweep of said triangular modulating signal, and means for detecting the beat frequency produced during the upsweep of said triangular modulating signal.

17. The system of claim 16 wherein said means for calculating includes means for summing the beat frequency produced by said fourth means during the downsweep of said triangular modulating signal with the beat frequency produced by said fourth means during the upsweep of said triangular modulating signal to produce said output representing slant range, and means for subtracting the beat frequency produced by said fourth means on the upsweep of the triangular modulating signal from the beat frequency produced by said fourth means on the downsweep of the triangular modulating signal to produce said output representing slant velocity.

18. The system of claim 12 wherein said means for calculating further includes means for correcting the calculated groundspeed to compensate for variations in the vertical velocity of an aircraft.

19. The system of claim 18 wherein said means for calculating further includes means for correcting said groundspeed for variations in the slant angle in order to compensate for the varaitions in the angle of return of the reflected signal from said second target area.

20. A method of providing an indication of aircraft groundspeed for an aircraft flying above a target area comprising:

transmitting an FMCW radar signal from said aircraft to a target area;

receiving first reflected return signals from a first target area vertically beneath said aircraft;

providing a signal indicative of aircraft altitude in reponse to said first reflected return signals;

receiving second reflected return signals from a second target area at a slant angle forward of said aircraft;

providing a signal indicative of aircraft slant velocity along said slant angle in response to said second reflected return signal;

providing a signal indicative of aircraft slant range to said second target area along said slant angle in response to said second reflected return signals; and calculating a value for aircraft groundspeed in response to the signals indicative of aircraft altitude, aircraft slant velocity, and aircraft slant range from a mathematical relationship correlating said aircraft altitude, aircraft slant range and aircraft slant velocity.

21. The method of claim 20 wherein said calculating step includes the step of compensating said groundspeed signal for variations in aircraft vertical velocity.

22. The method of claim 21 wherein said calculating step includes the step of compensating said groundspeed signal for variations in the slant angle of the reflected return signals from said second target area.

* * * * *